United States Patent
Sone

(10) Patent No.: US 11,258,917 B2
(45) Date of Patent: Feb. 22, 2022

(54) ELECTRONIC DEVICE CAPABLE OF CUSTOMIZING PROHIBITION CONTENT AND COMPUTER-READABLE NON-TRANSITORY RECORDING MEDIUM STORING PROGRAM FOR THE ELECTRONIC DEVICE

(71) Applicant: KYOCERA Document Solutions Inc., Osaka (JP)

(72) Inventor: Daiki Sone, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/189,716

(22) Filed: Mar. 2, 2021

(65) Prior Publication Data
US 2021/0281706 A1 Sep. 9, 2021

(30) Foreign Application Priority Data
Mar. 4, 2020 (JP) .............................. JP2020-036500

(51) Int. Cl.
*G06F 3/12* (2006.01)
*H04N 1/00* (2006.01)

(52) U.S. Cl.
CPC ......... *H04N 1/00938* (2013.01); *G06F 3/123* (2013.01); *G06F 3/1203* (2013.01); *H04N 1/0097* (2013.01)

(58) Field of Classification Search
None
See application file for complete search history.

(56) References Cited

U.S. PATENT DOCUMENTS

| | | | | |
|---|---|---|---|---|
| 2009/0037930 A1* | 2/2009 | Shiono | ...................... | G06F 8/61 719/313 |
| 2012/0257248 A1* | 10/2012 | Sato | ................... | H04N 1/00244 358/1.15 |
| 2014/0082581 A1* | 3/2014 | Ohhashi | ..................... | G06F 8/30 717/100 |
| 2017/0004299 A1* | 1/2017 | Yoshimura | .............. | G06F 21/33 |
| 2017/0091123 A1* | 3/2017 | Sato | ..................... | G06F 12/1441 |
| 2017/0223208 A1* | 8/2017 | Okamoto | .................. | G06F 8/61 |
| 2019/0095192 A1* | 3/2019 | Akita | ..................... | G06F 3/1285 |

(Continued)

FOREIGN PATENT DOCUMENTS

WO 2015/182303 12/2015

*Primary Examiner* — Henok Shiferaw
(74) *Attorney, Agent, or Firm* — Lex IP Meister, PLLC

(57) ABSTRACT

An image forming device includes a storage device, firmware for the image forming device, and a prohibition control unit configured to execute control relating to prohibition in the image forming device. The firmware includes prohibition information indicating the prohibition, and the prohibition control unit holds use prohibition information indicating the prohibition to be used when executing the control relating to the prohibition in the image forming device. After the prohibition control unit sets the prohibition indicated in the prohibition information included in the firmware into the use prohibition information, when a setting file indicating the prohibition to be set in the image forming device is stored in the storage device, the prohibition control unit updates the use prohibition information with the prohibition indicated in the setting file on the storage device.

6 Claims, 10 Drawing Sheets

(56) References Cited

U.S. PATENT DOCUMENTS

2019/0286379 A1* 9/2019 Tojo .................. G06F 3/1203
2019/0373130 A1* 12/2019 Han ..................... G06F 8/62
2019/0391771 A1* 12/2019 Sugano ............... G06F 13/102

* cited by examiner

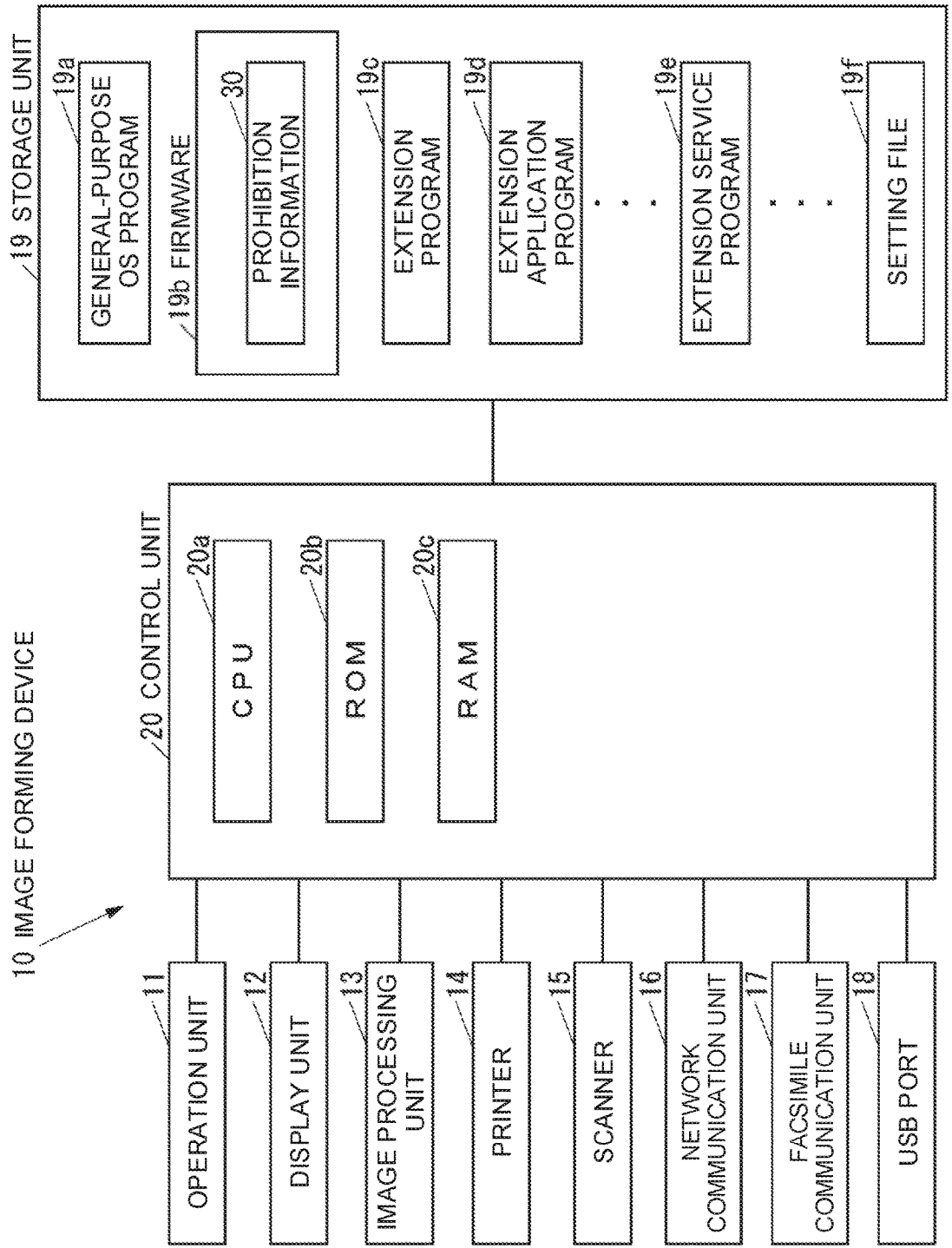

FIG. 2

| SIZE OF RECORDING MEDIUM | SETTING TO MP TRAY | SETTING TO CASSETTE | DISCHARGE TO SPECIFIC TRAY | DUPLEX PRINTING | STAPLING |
|---|---|---|---|---|---|
| A4 PORTRAIT | POSSIBLE | POSSIBLE | POSSIBLE | POSSIBLE | POSSIBLE |
| A4 LANDSCAPE | POSSIBLE | POSSIBLE | POSSIBLE | POSSIBLE | POSSIBLE |
| A3 | POSSIBLE | POSSIBLE | POSSIBLE | POSSIBLE | POSSIBLE |
| POSTCARD | POSSIBLE | IMPOSSIBLE | IMPOSSIBLE | POSSIBLE | IMPOSSIBLE |
| ENVELOPE | POSSIBLE | IMPOSSIBLE | IMPOSSIBLE | IMPOSSIBLE | IMPOSSIBLE |

30 PROHIBITION INFORMATION

FIG. 3

19f SETTING FILE

| SIZE OF RECORDING MEDIUM | SETTING TO MP TRAY | SETTING TO CASSETTE | DISCHARGE TO SPECIFIC TRAY | DUPLEX PRINTING | STAPLING |
|---|---|---|---|---|---|
| A4 PORTRAIT | POSSIBLE | POSSIBLE | POSSIBLE | POSSIBLE | POSSIBLE |
| A4 LANDSCAPE | POSSIBLE | POSSIBLE | POSSIBLE | POSSIBLE | POSSIBLE |
| A3 | POSSIBLE | POSSIBLE | POSSIBLE | POSSIBLE | POSSIBLE |
| POSTCARD | POSSIBLE | POSSIBLE | POSSIBLE | POSSIBLE | POSSIBLE |
| ENVELOPE | POSSIBLE | POSSIBLE | POSSIBLE | POSSIBLE | POSSIBLE |

ELECTRONIC DEVICE CAPABLE OF CUSTOMIZING PROHIBITION CONTENT AND COMPUTER-READABLE NON-TRANSITORY RECORDING MEDIUM STORING PROGRAM FOR THE ELECTRONIC DEVICE

INCORPORATION BY REFERENCE

This application is based upon, and claims the benefit of priority from, corresponding Japanese Patent Application No. 2020-036500 filed in the Japan Patent Office on Mar. 4, 2020, the entire contents of which are incorporated herein by reference.

BACKGROUND

Field of the Invention

The present disclosure relates to an electronic device and a computer-readable non-temporary recording medium storing a program which can customize prohibition content.

Description of Related Art

As a typical electronic device, there has been known an image forming device, which has a standard application which is an application realizing a standard function of an image forming device, an extension application which is an application realizing a function other than the standard function of the image forming device, and an extension function service which provides an extension function of the standard function of the image forming device to the extension application without using the standard application.

SUMMARY

An electronic device of the present disclosure includes a storage device, firmware for the electronic device, and a prohibition control unit configured to execute control relating to prohibition in the electronic device, wherein the firmware comprises prohibition information indicating the prohibition, wherein the prohibition control unit holds use prohibition information indicating the prohibition to be used when executing the control, and wherein after the prohibition control unit sets the prohibition indicated in the prohibition information included in the firmware into the use prohibition information, when a setting file indicating the prohibition to be set in the electronic device is stored in the storage device, the prohibition control unit updates the use prohibition information with the prohibition indicated in the setting file on the storage device.

A computer-readable non-temporary recording medium of the present disclosure stores a program, the program causes an electronic device including a storage device to realize a prohibition control unit for executing control relating to prohibition in the electronic device, wherein the prohibition control unit holds use prohibition information indicating the prohibition to be used in executing the control, and wherein after the prohibition control unit sets the prohibition indicated in prohibition information indicating the prohibition included in firmware for the electronic device into the use prohibition information, when a setting file indicating the prohibition to be set in the electronic device is stored in the storage device, the prohibition control unit updates the use prohibition information with the prohibition indicated in the setting file on the storage device.

BRIEF DESCRIPTION OF THE DRAWINGS

FIG. 1 is a block diagram of hardware of an image forming device according to an embodiment of the present disclosure;

FIG. 2 is a view illustrating an example of prohibition information included in firmware illustrated in FIG. 1;

FIG. 3 is a view illustrating an example of a setting file illustrated in FIG. 1;

DETAILED DESCRIPTION

Figure 4:
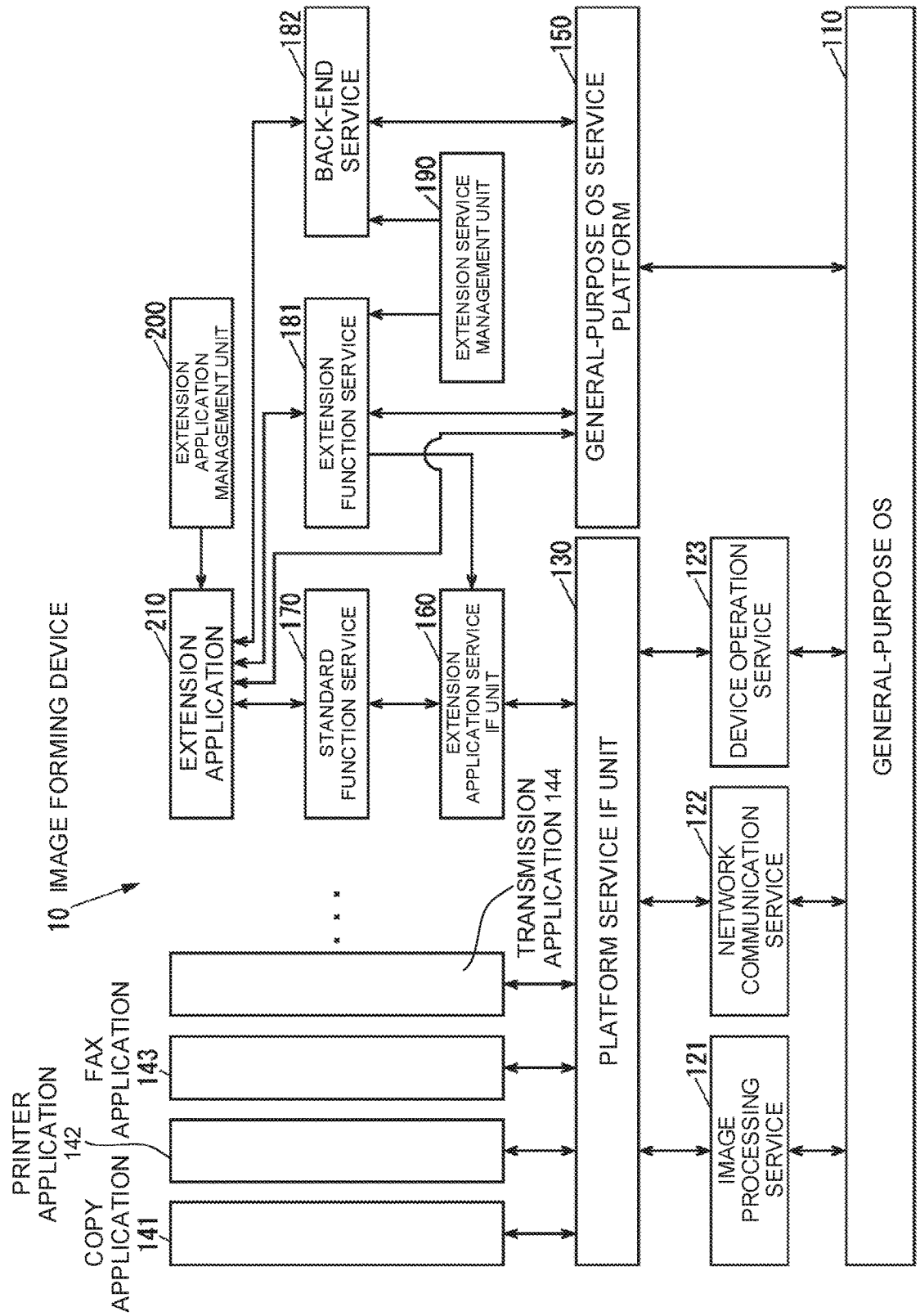
FIG. 4 is a block diagram illustrating a control configuration of the image forming device illustrated in FIG. 1.

Hereinafter, embodiments of the present disclosure will be described with reference to the drawings.

First, the configuration of an image forming device as an electronic device according to an embodiment of the present disclosure will be described.

FIG. 1 is a block diagram of hardware of an image forming device 10 according to the present embodiment.

As illustrated in FIG. 1, the image forming device 10 includes an operation unit 11 which is an operation device such as a button to which various operations are input, a display unit 12 which is a display device such as a liquid crystal display (LCD) to which various information is displayed, and an image processing unit 13 which is an image processing device such as a graphics processing unit (GPU) to execute various image processing such as enlargement, reduction, density adjustment, gradation adjustment, and image improvement to image data. The image forming device 10 further includes a printer 14 which is a printing device for printing an image on a recording medium such as paper, a scanner 15 which is a reading device for reading an image from a document, and a network communication unit 16 which is a communication device for communicating with an external device via a network such as a local area network (LAN) or the Internet, or directly by wire or wireless without using the network. The image forming device 10 further includes a facsimile communication unit 17 which is a facsimile device that performs facsimile communication with an external facsimile device not illustrated via a communication line such as a public telephone line, an universal serial bus (USB) port 18 which can be connected to an USB device such as an USB memory, a storage unit 19 which is a non-volatile storage device such as a semiconductor memory or a hard disk drive (HDD) for storing various kinds of information, and a control unit 20 which controls the entire image forming device 10. The image forming device 10 is, for example, a multifunction peripheral (MFP).

The storage unit 19 stores a general-purpose operating system (OS) program 19a (hereinafter referred to as "general-purpose OS program") such as Linux (registered trademark) for controlling each hardware of the image forming device 10.

The storage unit 19 stores firmware 19b of the image forming device 10. The firmware 19b includes prohibition information 30 indicating prohibition in the image forming device 10.

FIG. 2 illustrates an example of the prohibition information 30 included in the firmware 19b.

The prohibition information 30 in FIG. 2 is information indicating, for each size of the recording medium, whether it is possible to set as the size of the recording medium to be set to a multi-purpose (MP) tray in the printer 14, whether it is possible to set as the size of the recording medium to be set to a supply cassette for the recording medium in the printer 14, whether it is possible to discharge to a specific tray in the printer 14, whether it is possible to perform duplex printing in the printer 14, and whether it is possible to staple in the printer 14.

As illustrated in FIG. 4, the storage unit 19 stores an extension program 19c which is a program for realizing a function other than a standard function of the image forming device 10.

The storage unit 19 stores a program for an extension application (hereinafter referred to as "extension application program") 19d, which is an application for realizing a function other than the standard function of the image forming device 10. The storage unit 19 can store the extension application program for each extension application.

The storage unit 19 stores a program for an extension service (hereinafter referred to as "extension service program") 19e for providing a service using the general-purpose OS to the extension application without using the standard application which is the application for realizing the standard function of the image forming device 10. The storage unit 19 can store the extension service program for each extension service.

The storage unit 19 can store a setting file 19f indicating prohibition for setting in the image forming device 10 at a specific location on the storage unit 19.

FIG. 3 is a diagram illustrating an example of prohibition indicated in the setting file 19f.

Similar to the prohibition information 30 illustrated in FIG. 2, the setting file 19f illustrated in FIG. 3 is information indicating, for each size of the recording medium, whether it is possible to set as the size of the recording medium to be set in the MP tray in the printer 14, whether it is possible to set as the size of the recording medium to be set in the supply cassette of the recording medium in the printer 14, whether it is possible to discharge to a specific tray in the printer 14, whether it is possible to perform duplex printing in the printer 14, and whether it is possible to staple in the printer 14.

The control unit 20 includes, for example, a central processing unit (CPU) 20a, a read only memory (ROM) 20b storing a program and various kinds of data, and a random access memory (RAM) 20c as a memory used as a work area for the CPU 20a. The CPU 20a executes a program stored in the storage unit 19 or the ROM 20b.

The control unit 20 realizes the control configuration illustrated in FIG. 4 by executing a program stored in the storage unit 19 or the ROM 20b.

FIG. 4 is a block diagram illustrating a control configuration of the image forming device 10.

As illustrated in FIG. 4, the control unit 20 realizes a general-purpose OS 110 by executing the general-purpose OS program 19a (see FIG. 1).

The control unit 20 executes the firmware 19b (see FIG. 1) to realize an image processing service 121 that operates on the general-purpose OS 110 and provides a service related to image processing, a network communication service 122 that operates on the general-purpose OS 110 and provides a service related to the communication via the network, and a device operation service 123 that operates on the general-purpose OS 110 and provides a service for operating each hardware of the image forming device 10. Each of the image processing service 121, the network communication service 122, and the device operation service 123 controls each hardware of the image forming device 10 via the general-purpose OS 110.

The image processing service 121 may provide, for example, a service for setting resolution, color, and the like with the scanner 15, storing image data read from a document in the storage unit 19, and causing the image processing unit 13 to perform image processing to image data stored in the storage unit 19. The image processing service 121 may provide a service for drawing image data to be printed by the printer 14 based on a file. The image processing service 121 may provide a service for executing image processing such as enlargement, reduction, rotation, color conversion, noise removal, format conversion, character recognition, and watermark recognition on image data acquired from the extension application, image data read from a document by the scanner 15, or image data stored in the storage unit 19.

The network communication service 122 may provide a service for executing file transmission and reception, streaming, and authentication data transmission and reception via the network communication unit 16 using various protocols such as TCP/IP and UDP. For example, the network communication service 122 can transmit and receive image data read from a document by the scanner 15 and a file stored in the storage unit 19. Note that the network communication service 122 can execute transmission and reception of image data transmitted or received by facsimile by the facsimile communication unit 17, transmission and reception of the result of user authentication by an user authentication unit when the image forming device 10 has the user authentication unit that authenticates the user by IC card or biometric authentication, transmission and reception of image data generated by a camera when the image forming device 10 has the camera, and the like. The network communication service 122 can also transmit and receive the status of each part of the image forming device 10, the result of calling the function of each part of the image forming device 10, and the like.

The device operation service 123 may provide a service for executing processing such as drawing on the display unit 12, driving the printer 14, controlling the facsimile communication unit 17, user authentication, and obtaining the status of each hardware of the image forming device 10. The device operation service 123 may provide, for example, a service for storing image data read from a document by the scanner 15 into the storage unit 19. The device operation service 123 may also provide a service for rendering an image on a browser displayed on the display unit 12. The device operation service 123 may also provide a service for transmitting image data to the printer 14 to form an image. The device operation service 123 may also provide a service for causing the facsimile communication unit 17 to execute facsimile transmission to transmit image data stored in the storage unit 19. The device operation service 123 may provide a service for causing an optional equipment to perform processing such as bookbinding and stapling when the image forming device 10 has the optional equipment such as a finisher. The device operation service 123 may also provide a service for causing a user authentication unit to perform user authentication when the image forming device 10 has the user authentication unit that authenticates a user by IC card or biometric authentication. The device operation service 123 may also provide a service for causing a camera to generate video data and calling each function such as line-of-sight detection based on the video data generated by the camera when the image forming device 10 has the camera. The device operation service 123 may provide a service for executing detailed control of each hardware of the image forming device 10, such as driving one of motors in a conveyance unit of the printer 14. The device operation service 123 may provide a service for acquiring the state of each part of the image forming device 10.

The control unit 20 executes the firmware 19b to realize a platform service IF unit 130, which provides an interface for calling the image processing service 121, the network communication service 122, and the device operation service 123.

Figure 5:
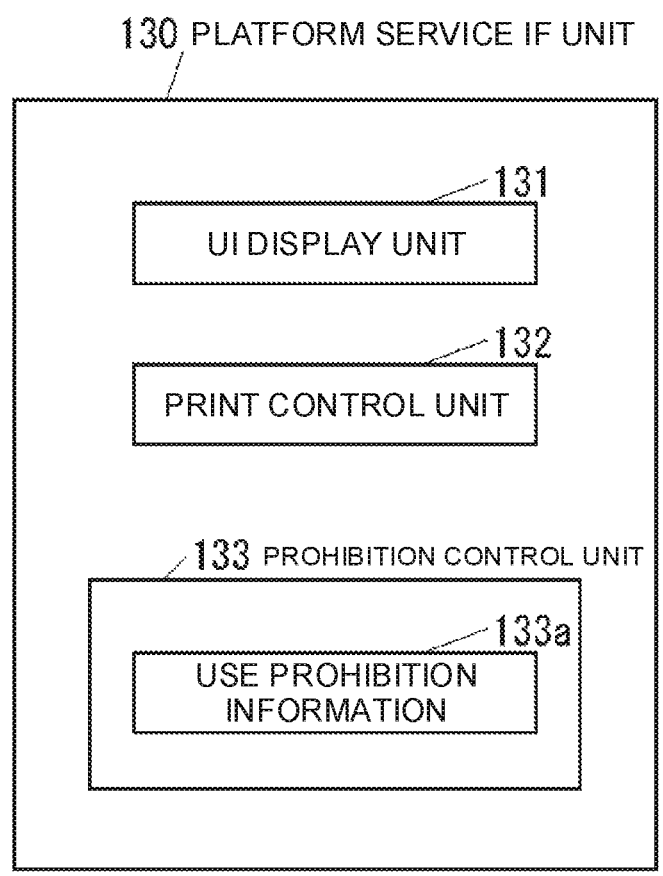
FIG. 5 is a diagram illustrating a configuration of a platform service interface (IF) unit illustrated in FIG. 4.

FIG. 5 is a diagram illustrating the configuration of the platform service IF unit 130.

As illustrated in FIG. 5, the platform service IF unit 130 includes a UI display unit 131 which is a process for managing the display related to the graphical user interface (GUI) on the display unit 12, a print control unit 132 which is a process for executing print control by the printer 14, and a prohibition control unit 133 which executes control relating to prohibition. The prohibition control unit 133 holds use prohibition information 133a used when executing the control relating to the prohibition in the RAM 20c. The prohibition control unit 133 is a library for performing a check related to the prohibition.

As illustrated in FIG. 4, the control unit 20 realizes the standard application by executing the firmware 19b (see FIG. 1). The standard application operates on the platform service IF unit 130 and utilizes each hardware of the image forming device 10. For example, the control unit 20 realizes a copy application 141 which is a standard application for reading an image from a document by the scanner 15 in response to an instruction input to the operation unit 11, and realizing a copy to print the read image by the printer 14. The control unit 20 further realizes a printer application 142 which is a standard application for printing, by the printer 14, an image based on data received by the network communication unit 16 such as data described in a page description language (PDL). The control unit 20 further realizes a facsimile application 143, which is a standard application for reading an image from a document by the scanner 15 in accordance with an instruction input to the operation unit 11 and transmitting the read image by the facsimile communication unit 17. The control unit 20 further realizes a transmission application 144 which is a standard application for reading an image from a document by the scanner 15 in accordance with an instruction input to the operation unit 11 and transmitting the read image by the network communication unit 16. The printer application 142 may print an image based on a file stored in the storage unit 19 by the printer 14 in response to an instruction input to the operation unit 11. The facsimile application 143 may transmit an image based on the file received by the network communication unit 16 by the facsimile communication unit 17. The facsimile application 143 may further print the image received by the facsimile communication unit 17 by the printer 14. The facsimile application 143 may further store the image received by the facsimile communication unit 17 into the storage unit 19.

The control unit 20 realizes a general-purpose OS service platform 150 which provides a service using the general-purpose OS 110 without intervening the platform service IF unit 130 by executing the extension program 19c (see FIG. 1). The general-purpose OS service platform 150 may provide a service for adding a function to the general-purpose OS 110, for example, such as installing a control program such as a device driver or a script into the general-purpose OS 110.

The control unit 20 realizes an extension application service IF unit 160 that provides an interface for using the platform service IF unit 130 from the extension application side by executing the extension program 19c.

The control unit 20 realizes a standard function service 170, which is a service for providing the standard function of the image forming device 10 to the extension application by using the standard application, by executing the extension program 19c. The standard function service 170 uses the standard application via the extension application service IF unit 160. For example, the extension application can display a scree for starting to copy by the copy application 141 on the display unit 12 by using the standard function service 170. Further, by using the standard function service 170, the extension application can cause the printer application 142 to print various kinds of job data, file, or the like, which are acquired by the extension application itself or specified by the operation unit 11. Further, by using the standard function service 170, the extension application can acquire image data designated via the operation unit 11 among the facsimile image data received by the facsimile application 143, or cause the facsimile application 143 to transmit a file or the like designated via the operation unit 11.

The control unit 20 executes an extension service program (see FIG. 1) to realize an extension service, which is a service providing a function other than the standard function of the image forming device 10. For example, the control unit 20 realizes an extension function service 181, which is an extension service for providing, to the extension application, a service for using the platform service IF unit 130 without using any standard application and using the general-purpose OS 110 by using the general-purpose OS service platform 150. The control unit 20 further realizes a back-end service 182, which is an extension service for providing, to the extension application, a service using the general-purpose OS 110 by using the general-purpose OS service platform 150 without using the platform service IF unit 130. The extension function service 181 uses the platform service IF unit 130 via the extension application service IF unit 160. The control unit 20 can realize at least one extension function service other than the extension function service 181. The control unit 20 can realize at least one back-end service other than the back-end service 182.

The extension function service is a service that provides an extension function of the standard function of the image forming device 10 to the extension application. For example, the control unit 20 realizes a storage access service for accessing the storage unit 19 as one of the extension function services.

The back-end service is a service that runs on the back-end. The back-end service is a service that provides a function other than the extension function of the standard function of the image forming device 10 among functions other than the standard function of the image forming device 10. The back-end service is, for example, a service providing a function of monitoring the image forming device 10, a service providing a function of monitoring the entire system composed of a plurality of image forming devices, and a service providing a function of monitoring a specific server. Further, the back-end service is, for example, a service providing a function of collecting information such as a counter indicating the number of printed sheets of the image forming device 10 from the image forming device 10 and converting the collected information into information in a format that can be understood by a human, and a service that provides a function of converting the format of information output from the image forming device 10 from an old type interface format to a new type interface format.

The control unit 20 executes the extension program 19c to realize an extension service management unit 190 which manages the extension service such as activating, initiating, and stopping the extension service. The extension service management unit 190 monitors the state of the extension service and the general-purpose OS service platform 150.

The control unit 20 executes the extension program 19c to realize an extension application management unit 200 which manages the extension application such as activating, initiating, and stopping the extension application.

The control unit 20 realizes an extension application 210 by executing the extension application program 19d (see FIG. 1). Note that the control unit 20 can realize at least one extension application other than the extension application 210. The extension application is an application that a user directly uses, and has a user interface. The user can use the function provided by the extension application by operating the user interface of the extension application. For example, the extension application may be a practical application for an optical character recognition (OCR), a surveillance camera application, a watermark creation, an invoice creation, an employee list management, a slip management, a contract management, a business card management, a PDF creation, a book management, a group management, and the like. The extension application may also be an installer application that executes to add or change a device driver and firmware on the general-purpose OS 110, or other management applications. The extension application can call the standard function service 170, and use the general-purpose OS 110 by using the standard application. The extension application can also call the extension service, and use the general-purpose OS 110 without using any standard application. The extension application can also use the general-purpose OS 110 by directly calling the general-purpose OS service platform 150.

Next, the operation of the image forming device 10 will be described.

First, the operation of the image forming device 10 when the setting file 19f is installed will be described.

Figure 6:
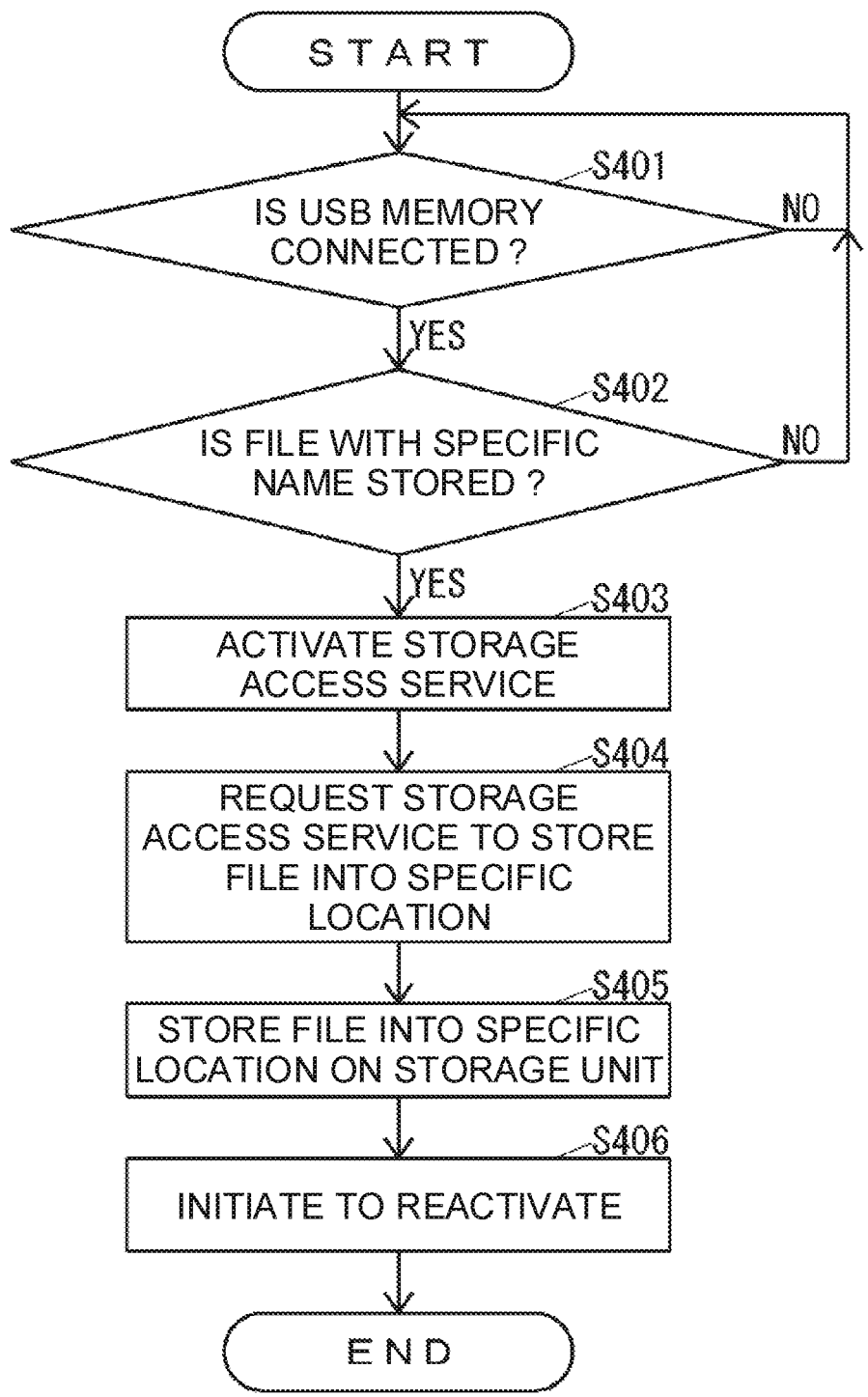
FIG. 6 is a flowchart illustrating an operation of the image forming device illustrated in FIG. 1 when the setting file is installed.

FIG. 6 is a flowchart illustrating the operation of the image forming device 10 when the setting file 19f is installed.

As illustrated in FIG. 6, the extension service management unit 190 determines whether the USB memory is connected to the USB port 18 until the extension service management unit 190 determines that the USB memory is connected to the USB port 18 (S401).

When the extension service management unit 190 determines in S401 that the USB memory is connected to the USB port 18, the extension service management unit 190 determines whether a file with a specific name is stored in the USB memory connected to the USB port 18 (S402).

When the extension service management unit 190 determines in S402 that a file with a specific name is not stored in the USB memory connected to the USB port 18, the extension service management unit 190 executes the processing of S401.

When the extension service management unit 190 determines in S402 that a file with a specific name is stored in the USB memory connected to the USB port 18, the extension service management unit 190 activates the storage access service which is the extension function service (S403).

Next, the extension service management unit 190 requests the storage access service to store the file with the specific name stored in the USB memory connected to the USB port 18 into a specific location on the storage unit 19 (S404).

When the storage access service receives the request in S404, the storage access service stores the file with the specific name stored in the USB memory connected to the USB port 18 into the specific location on the storage unit 19 via the extension application service IF unit 160, the platform service IF unit 130, the device operation service 123, and the general-purpose OS 110 (S405). Note that the extension service management unit 190 can confirm via the general-purpose OS 110 that the file has been written to the specific location on the storage unit 19.

After the processing of S405, the extension service management unit 190 initiates to reactivate the image forming device 10 (S406). That is, the image forming device 10 is turned on again after the image forming device 10 is turned off once.

The image forming device 10 executes the operation illustrated in FIG. 6. Therefore, the user can install the setting file 19f at a specific location on the storage unit 19 by storing the setting file indicating prohibition for setting to the image forming device 10 into the USB memory with a specific name, and connecting the USB memory to the USB port 18.

Note that, in the operation illustrated in FIG. 6, the extension service management unit 190 installs the file stored in the USB memory connected to the USB port 18 into the specific location on the storage unit 19. However, the extension service management unit 190 may install a file other than the file stored in the USB memory connected to the USB port 18 into the specific location on the storage unit 19. For example, the extension service management unit 190 may be configured to install a file having a specific name transmitted via the Web application programming interface (API) into the specific location on the storage unit 19.

Next, the operation when the image forming device 10 is activated will be described.

Figure 7:
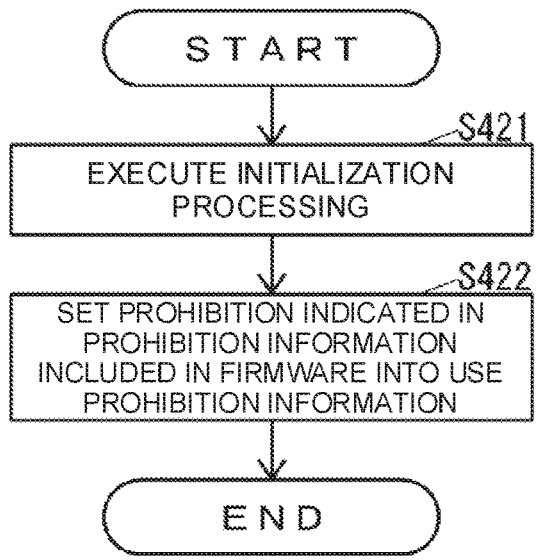
FIG. 7 is a flowchart of an operation when the image forming device illustrated in FIG. 1 is activated.

FIG. 7 is a flowchart illustrating the operation when the image forming device 10 is activated.

The control unit 20 executes the operation illustrated in FIG. 7 when the image forming device 10 is activated.

As illustrated in FIG. 7, the control unit 20 executes initialization processing for each part of the image forming device 10 such as the UI display unit 131 and the print control unit 132 (S421).

Next, the prohibition control unit 133 sets the prohibition indicated in the prohibition information 30 included in the firmware 19b to the use prohibition information 133a (S422), and then ends the operation illustrated in FIG. 7.

Next, the operation of the prohibition control unit 133 for updating the use prohibition information 133a when the image forming device 10 is activated will be described.

Figure 8:
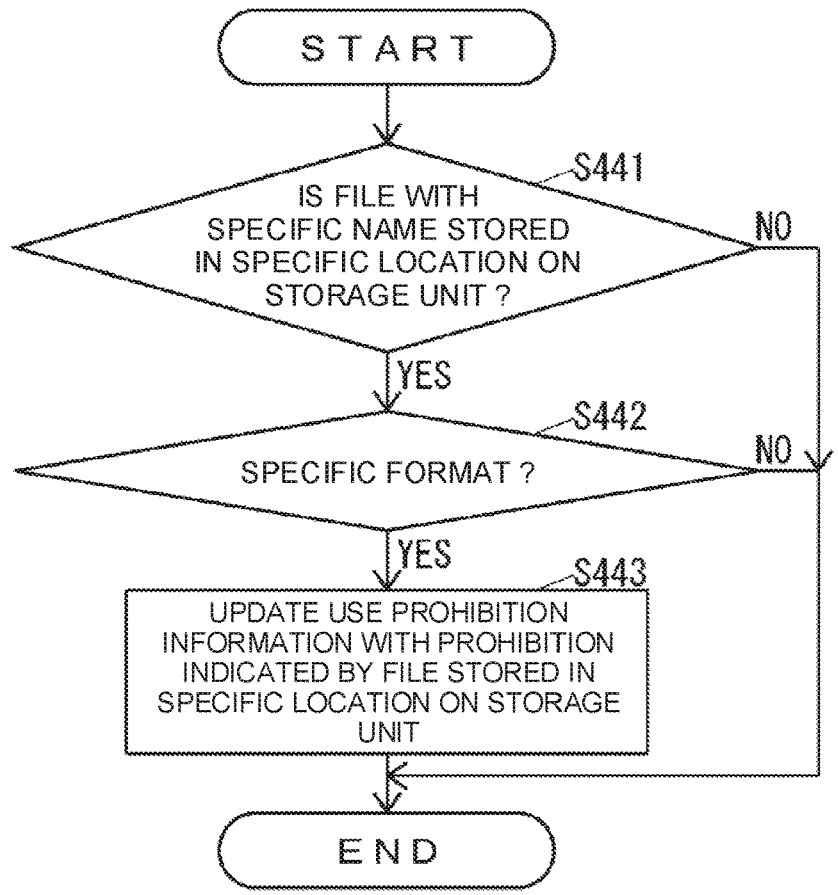
FIG. 8 is a flowchart of an operation of a prohibition control unit illustrated in FIG. 5 for updating use prohibition information when the image forming device is activated.

FIG. 8 is a flowchart of the operation of the prohibition control unit 133 for updating the use prohibition information 133a when the image forming device 10 is activated.

The prohibition control unit 133 executes the operation illustrated in FIG. 8 after the operation illustrated in FIG. 7 is completed.

As illustrated in FIG. 8, the prohibition control unit 133 determines whether a file with a specific name is stored in a specific location on the storage unit 19 (S441). Here, the prohibition control unit 133 accesses the storage unit 19 via the device operation service 123 and the general-purpose OS 110.

When the prohibition control unit 133 determines in S441 that a file with a specific name is stored in a specific location on the storage unit 19, the prohibition control unit 133 determines whether the format of the file with the specific name stored in the specific location on the storage unit 19 is a specific format (S442).

When the prohibition control unit 133 determines in S442 that the format of the file with the specific name stored in the specific location on the storage unit 19 is a specific format, the prohibition control unit 133 updates the use prohibition information 133a with the prohibition indicated by the file with the specific name stored in the specific location on the storage unit 19, that is, the setting file 19f (S443).

When the prohibition control unit 133 determines in S441 that a file with a specific name is not stored in a specific location on the storage unit 19, determines in S442 that the format of the file with the specific name stored in the specific location on the storage unit 19 is not a specific format, or completes the processing in S443, the prohibition control unit 133 ends the operation illustrated in FIG. 8.

Next, the operation of the image forming device 10 in setting the size of the recording medium to be set in the MP tray will be described.

Figure 9:
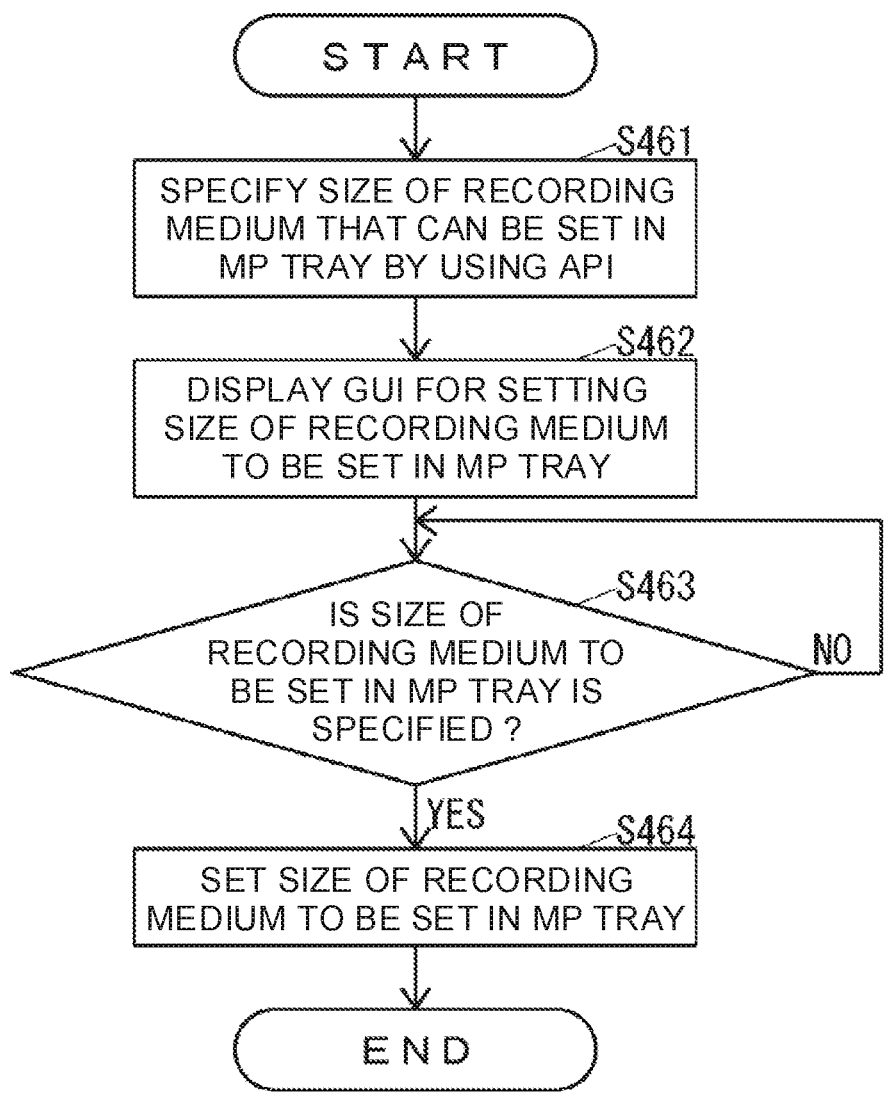
FIG. 9 is a flowchart illustrating an operation of the image forming device illustrated in FIG. 1 in setting the size of a recording medium set in a multi-purpose (MP) tray.

FIG. 9 is a flowchart illustrating the operation of the image forming device 10 in setting the size of the recording medium to be set in the MP tray.

When the control unit 20 receives an instruction to initiate the setting of the size of the recording medium to be set in the MP tray via the operation unit 11, the control unit 20 executes the operation illustrated in FIG. 9.

As illustrated in FIG. 9, the UI display unit 131 uses the API for specifying the size of the recording medium that can be set in the MP tray among the APIs of the prohibition control unit 133 to specify the size of the recording medium that can be set in the MP tray (S461). At this time, the prohibition control unit 133 notifies the UI display unit 131 of the size of the recording medium that can be set in the MP tray, based on the use prohibition information 133a. That is, the API for specifying the size of the recording medium that can be set in the MP tray is an API using the use prohibition information 133a.

After the processing of S461, the UI display unit 131 displays a GUI for setting the size of the recording medium to be set in the MP tray on the display unit 12 (S462). Here, the UI display unit 131 displays a GUI in which only the size specified in S461 can be set.

After the processing of S462, the control unit 20 determines whether the size of the recording medium to be set in the MP tray is specified by the GUI displayed in S462 until the control unit 20 determines that the size of the recording medium to be set in the MP tray is specified by the GUI displayed in S462 (S463).

When the control unit 20 determines in S463 that the size of the recording medium to be set in the MP tray is specified by the GUI displayed in S462, the control unit 20 sets the size specified by the GUI displayed in S462 as the size of the recording medium to be set in the MP tray (S464), and then ends the operation illustrated in FIG. 9.

The operation of the image forming device 10 in setting the size of the recording medium to be set in the MP tray is described above. However, the same applies to the operation of the image forming device 10 in setting the size of the recording medium to be set in the supply cassette.

Next, the operation of the image forming device 10 when printing is executed will be described.

Figure 10:
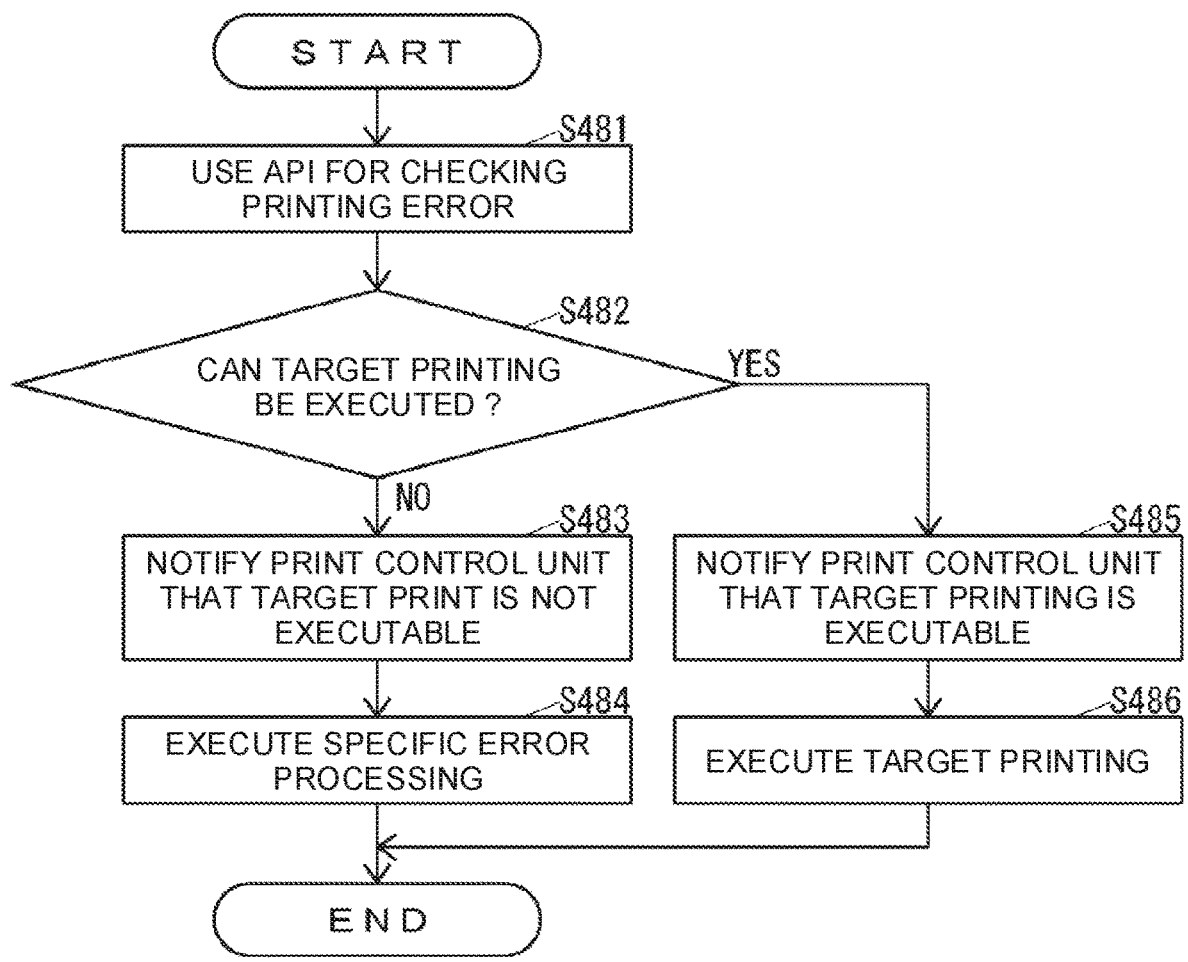
FIG. 10 is a flowchart illustrating an operation of the image forming device illustrated in FIG. 1 when printing is executed.

FIG. 10 is a flowchart illustrating the operation of the image forming device 10 when printing is executed.

The control unit 20 executes the operation illustrated in FIG. 10 when printing is executed.

As illustrated in FIG. 10, the print control unit 132 uses an API for checking a printing error among the APIs of the prohibition control unit 133 (S481).

When the API for checking a printing error is used in S481, the prohibition control unit 133 determines whether a target can be printed, based on the setting of the target printing and the prohibition relating to the printing in the use prohibition information 133a (S482). That is, the API for checking a printing error is an API using the use prohibition information 133a. Here, the prohibition relating to the printing includes whether the printer 14 can discharge to a specific tray, whether the printer 14 can perform duplex printing, and whether the printer 14 can staple. For example, in case that the destination for discharging set for the target printing is a specific tray, when the use prohibition information 133a indicates that it is impossible to discharge to the specific tray with the size of the recording medium set for the target printing, the prohibition control unit 133 determines that the target printing is not executable. Further in case that duplex printing is set for the target printing, when the use prohibition information 133a indicates that it is impossible to perform duplex printing with the size of the recording medium set for the target printing, the prohibition control unit 133 determines that the target printing is not executable. Furthermore, in case that stapling is set for the target printing, when the use prohibition information 133a indicates that it is impossible to staple with the size of the recording medium set for the target printing, the prohibition control unit 133 determines that the target printing is not executable.

When the prohibition control unit 133 determines in S482 that the target print is not executable, the prohibition control unit 133 notifies the print control unit 132 that the target print is not executable (S483).

Therefore, the print control unit 132 executes specific error processing (S484), and ends the operation illustrated in FIG. 10.

When the prohibition control unit 133 determines in S482 that the target printing is executable, the prohibition control unit 133 notifies the print control unit 132 that the target printing is executable (S485).

Therefore, the print control unit 132 executes the target printing (S486), and then ends the operation illustrated in FIG. 10.

In the above, the prohibition control unit 133 updates the use prohibition information 133a when the image forming device 10 is activated (S441 to S443). However, the prohibition control unit 133 may update the use prohibition information 133a when the API using the use prohibition information 133a is used, instead of updating the use prohibition information 133a at the time of activating the image forming device 10.

Figure 11:
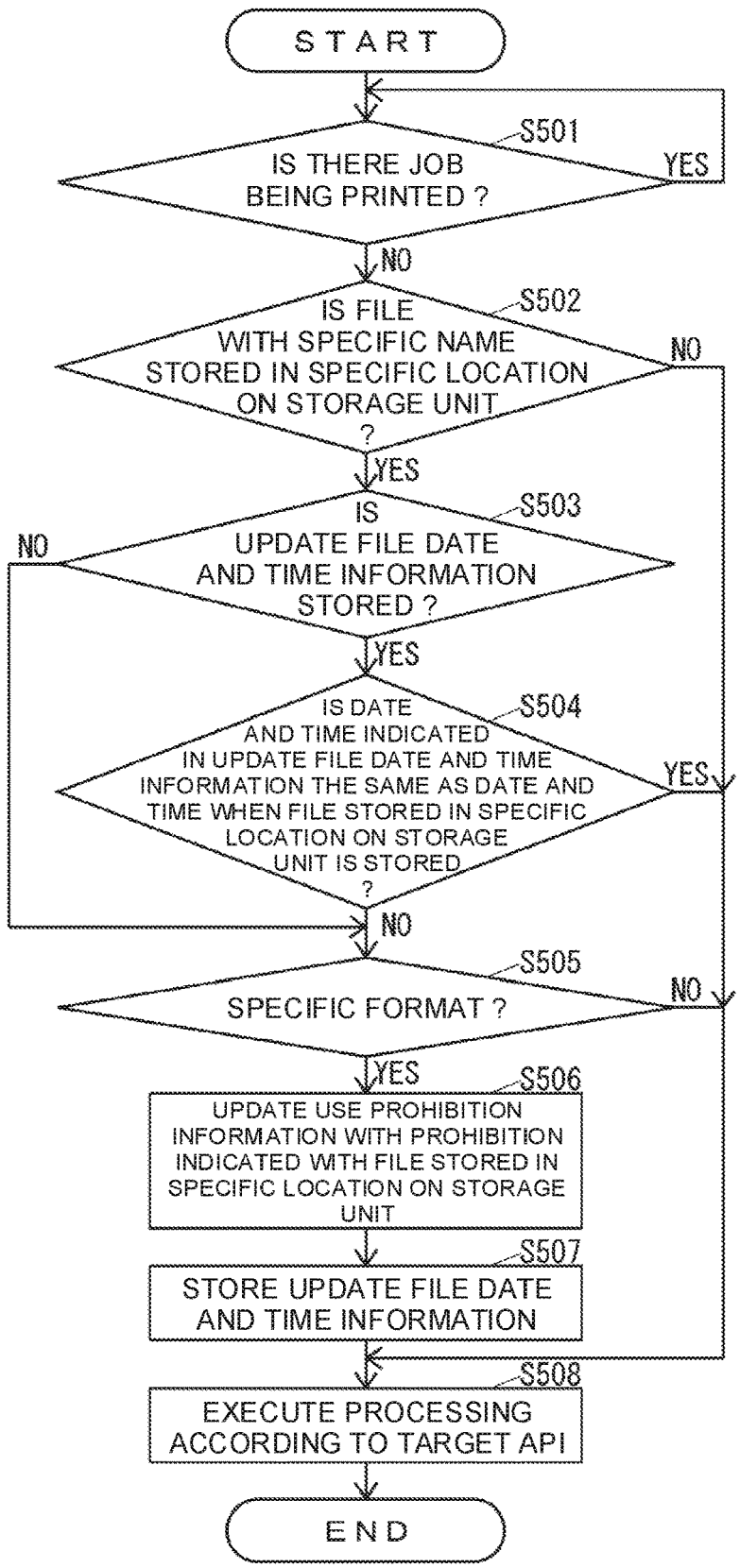
FIG. 11 is a flowchart of an operation of the prohibition control unit illustrated in FIG. 5 for updating the use prohibition information when an application programming interface (API) using the use prohibition information is used.

FIG. 11 is a flowchart of the operation of the prohibition control unit 133 in updating the use prohibition information 133a when the API using the use prohibition information 133a is used.

The prohibition control unit 133 executes the operation illustrated in FIG. 11 when the use of the API using the use prohibition information 133a (hereinafter referred to as "target API") among the APIs of the prohibition control unit 133 itself is instructed.

As illustrated in FIG. 11, the prohibition control unit 133 determines whether there is a job being printed until the prohibition control unit 133 determines that there is no job being printed (S501).

When the prohibition control unit 133 determines in S501 that there is no job being printed, the prohibition control unit 133 determines whether a file with a specific name is stored in a specific location on the storage unit 19 (S502). Here, the prohibition control unit 133 accesses the storage unit 19 via the device operation service 123 and the general-purpose OS 110.

When the prohibition control unit 133 determines in S502 that a file with a specific name is stored in a specific location on the storage unit 19, the prohibition control unit 133 determines whether update file date and time information indicating the date and time when the setting file used for updating the use prohibition information 133a is stored in the storage unit 19 is stored in a specific location on the RAM 20c (S503).

When the prohibition control unit 133 determines in S503 that the update file date and time information is stored in a specific location on the RAM 20c, the prohibition control unit 133 determines whether the date and time indicated in the update file date and time information stored in the specific location on the RAM 20c is the same as the date and time when a file with a specific name stored in the specific location on the storage unit 19 is stored in the storage unit 19 (S504).

When the prohibition control unit 133 determines in S503 that the update file date and time information is not stored in a specific location on the RAM 20c, or determines in S504 that the date and time indicated in the update file date and time information stored in a specific location on the RAM 20c is not the same as the date and time when a file with a specific name stored in a specific location on the storage unit 19 is stored in the storage unit 19, the prohibition control unit 133 determines whether the format of the file with the specific name stored in the specific location on the storage unit 19 is a specific format (S505).

When the prohibition control unit 133 determines in S505 that the format of the file with the specific name stored in the specific location on the storage unit 19 is a specific format, the prohibition control unit 133 updates the use prohibition information 133a with the prohibition indicated with the file with the specific name stored in the specific location on the storage unit 19, that is, the setting file 19f (S506).

Next, the prohibition control unit 133 stores the update file date and time information indicating the date and time that the file with the specific name stored in the specific location on the storage unit 19, that is, the setting file 19f is stored in the storage unit 19 into a specific location on the RAM 20c (S507).

When the prohibition control unit 133 determines in S502 that a file with a specific name is not stored in the specific location on the storage unit 19, determines in S504 that the date and time indicated by the update file date and time information stored in the specific location on the RAM 20c is the same as the date and time when the file with the specific name stored in the specific location on the storage unit 19 is stored into the storage unit 19, determines in S505 that the format of the file with the specific name stored in the specific location on the storage unit 19 is not a specific format, or completes the processing in S507, the prohibition control unit 133 executes processing according to the target API (S508), and then ends the operation illustrated in FIG. 11.

Note that when the prohibition control unit 133 executes the operation illustrated in FIG. 11 instead of the operation illustrated in FIG. 8, the processing of S406 (see FIG. 6) may not be executed.

As described above, the image forming device 10 sets the prohibition indicated in the prohibition information 30 included in the firmware 19b into the use prohibition information 133a indicating the prohibition to be used when executing the control relating to the prohibition (S422), and then updates the use prohibition information 133a with the prohibition indicated in the setting file 19f on the storage unit 19 (S443 or S506). Therefore, the image forming device 10 can customize the content of the prohibition by changing the setting file 19f even when the firmware 19b is not customized. As a result, the image forming device 10 can reduce the time and labor required for customizing the content of the prohibition.

As illustrated in FIG. 8, in the configuration in which the use prohibition information 133a is updated with the prohibition indicated in the setting file 19f on the storage unit 19 at the timing of activating the image forming device 10 (S443), the image forming device 10 can reduce the load at the time of using the API using the use prohibition information 133a, in comparison with the configuration in which the use prohibition information 133a is updated with the prohibition indicated in the setting file 19f on the storage unit 19 at the time of using the API using the use prohibition information 133a (S506).

As illustrated in FIG. 11, in the configuration that the use prohibition information 133a is updated with the prohibition indicated in the setting file 19f on the storage unit 19 when the API using the use prohibition information 133a is used (S506), the image forming device 10 can reduce the load at the time of activating the image forming device 10, in comparison with the configuration that the use prohibition information 133a is updated with the prohibition indicated in the setting file 19f on the storage unit 19 when the image forming device 10 is activated (S443).

The image forming device 10 stores the setting file 19f into the storage unit 19 by using the storage access service which is the extension service (S405). Therefore, the image forming device 10 can make it difficult for a user, who cannot use the storage access service, to store the setting file 19f into the storage unit 19. Further, the image forming device 10 can reduce the possibility that the content of the prohibition are freely customized by the user.

Any ones of the plurality of programs in the present embodiment may be configured as one program. For example, the firmware 19b, the extension program 19c, and the extension service program may be configured as one program.

Although the electronic device of the present disclosure is an image forming device in the present embodiments, the electronic device may be an electronic device other than the image forming device such as a personal computer (PC).

What is claimed is:

1. An electronic device comprising:
a storage device;
firmware for the electronic device, to be executed by a computer; and
a prohibition control unit implemented by the firmware, that executes control relating to prohibition in the electronic device,
wherein the firmware comprises prohibition information indicating the prohibition;
wherein the prohibition control unit holds use prohibition information indicating the prohibition to be used and executes the control by using the use prohibition information, and
wherein the prohibition control unit updates the use prohibition information such that the prohibition control unit sets the prohibition indicated in the prohibition information comprised in the firmware into the use prohibition information, and thereafter, the prohibition control unit determines whether a setting file indicating the prohibition to be set in the electronic device is stored in the storage device, and updates the use prohibition information with the prohibition indicated in the setting file on the storage device in accordance with a determination result, the setting file being of a format of the prohibition information.

2. The electronic device according to claim 1,
wherein the prohibition control unit updates the use prohibition information with the prohibition indicated in the setting file on the storage device when the electronic device is activated.

3. The electronic device according to claim 1,
wherein the prohibition control unit updates the use prohibition information with the prohibition indicated in the setting file on the storage device when an Application Programming Interface (API) using the use prohibition information is used.

4. The electronic device according to claim 1, the electronic device further comprising:
an extension service configured to provide, to an extension application which is an application for realizing a function other than a standard function of the electronic device, the function other than the standard function, without using a standard application which is an application for realizing the standard function; and
an extension service management unit implemented by a computer, that manages the extension service,
wherein the extension service management unit stores the setting file into the storage device using a storage access service which is the extension service for accessing the storage device.

5. A computer-readable non-transitory recording medium storing a program, the program causing an electronic device comprising a storage device to realize a prohibition control unit for executing control relating to prohibition in the electronic device,
wherein the prohibition control unit holds use prohibition information indicating the prohibition to be used in executing the control, and
wherein the prohibition control unit updates the use prohibition information such that the prohibition control unit sets the prohibition indicated in prohibition information indicating the prohibition comprised in firmware for the electronic device into the use prohibition information, and thereafter, the prohibition control unit determines whether a setting file indicating the prohibition to be set in the electronic device is stored in the storage device, and updates the use prohibition information with the prohibition indicated in the setting file on the storage device in accordance with a determination result, the setting file indicating the prohibition in a same format as the prohibition information.

6. An electronic device comprising:
a storage device;
firmware for the electronic device, to be executed by a computer;
a prohibition control unit implemented by the firmware, that executes control relating to prohibition in the electronic device,
an extension service configured to provide, to an extension application which is an application for realizing a function other than a standard function of the electronic device, the function other than the standard function, without using a standard application which is an application for realizing the standard function; and
an extension service management unit implemented by the computer, that manages the extension service,
wherein the firmware comprises prohibition information indicating the prohibition;
wherein the prohibition control unit holds use prohibition information indicating the prohibition to be used when executing the control,
wherein after the prohibition control unit sets the prohibition indicated in the prohibition information comprised in the firmware into the use prohibition information, when a setting file indicating the prohibition to be set in the electronic device is stored in the storage device, the prohibition control unit updates the use prohibition information with the prohibition indicated in the setting file on the storage device, and
wherein the extension service management unit stores the setting file into the storage device using a storage access service which is the extension service for accessing the storage device.

* * * * *